O. T. CUPPET.
HOE.
APPLICATION FILED JUNE 15, 1909.
937,927.
Patented Oct. 26, 1909.
2 SHEETS—SHEET 2.
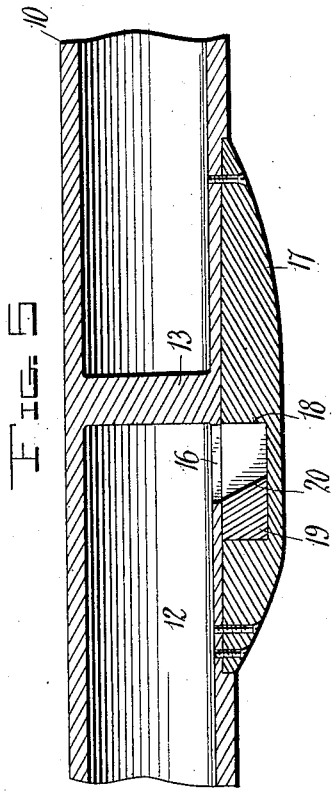
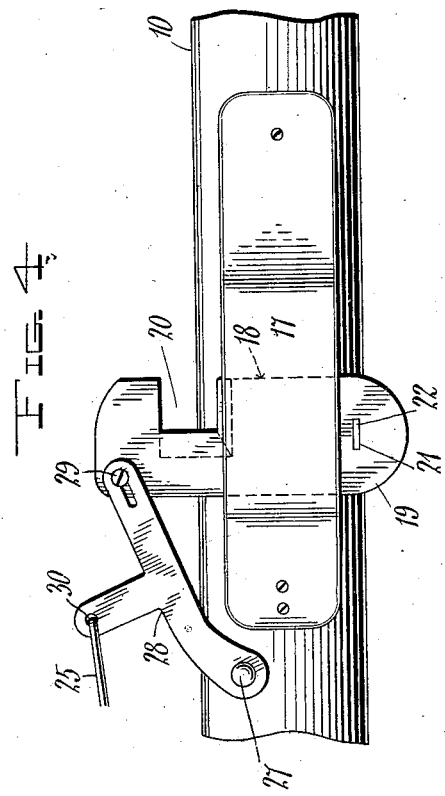
Witnesses
Inventor
Obie T. Cuppet
By Chandler & Chandler
Attorneys

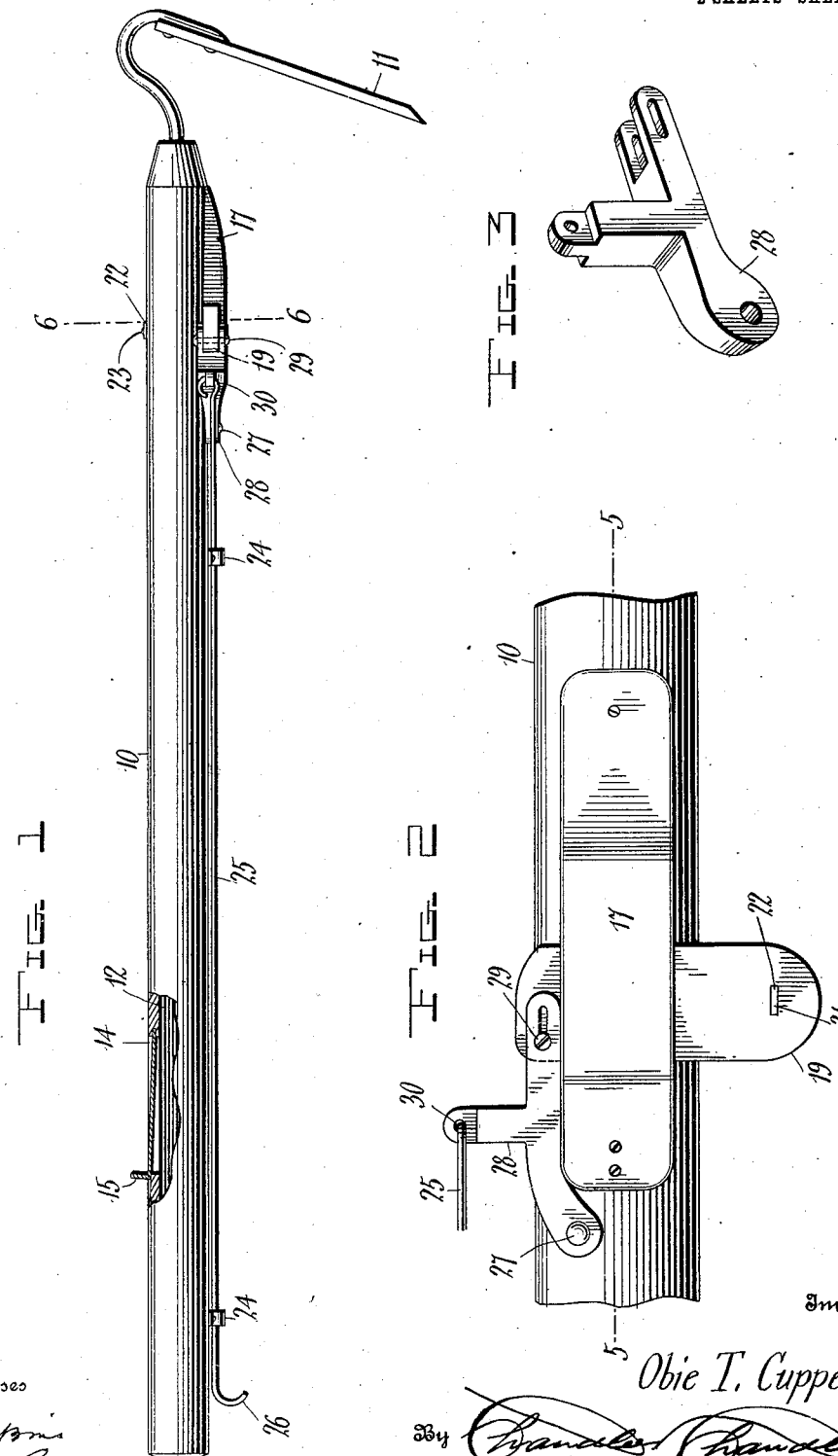

UNITED STATES PATENT OFFICE.

OBIE T. CUPPET, OF CLIFTON MILLS, WEST VIRGINIA.

HOE.

937,927.

Specification of Letters Patent.

Patented Oct. 26, 1909.

Application filed June 15, 1909. Serial No. 502,275.

*To all whom it may concern:*

Be it known that I, OBIE T. CUPPET, a citizen of the United States, residing at Clifton Mills, in the county of Preston, State of West Virginia, have invented certain new and useful Improvements in Hoes; and I do hereby declare the following to be a full, clear, and exact description of the invention, such as will enable others skilled in the art to which it appertains to make and use the same.

This invention relates to agricultural implements and has special reference to a hoe designed to carry corn or other seed and drop the same in measured quantities during the operation of hoeing.

One object of the invention is to improve the general construction of hoes of this character.

Another object of the invention is to provide an improved form of seeder for use with hoes of this character.

A third object of the invention is to so arrange the seeding device that when the hoe is canted in the usual manner common in digging a hole to plant the seed, the dropped seed will fall directly in the hole and not to one side thereof.

With the above and other objects in view the invention consists in general of a hoe provided with a seed receptacle and having a device for delivering the seed therefrom which acts to deliver the seed sidewise.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a partial side elevation of a hoe constructed in accordance with this invention. Fig. 2 is an under-side view of a portion of the hoe disclosing the delivery mechanism. Fig. 3 is a view of the rock lever used in the delivery mechanism. Fig. 4 is a view similar to Fig. 2 showing the device in the delivery position. Fig. 5 is a section on the line 5—5 of Fig. 2. Fig. 6 is a transverse section through the hoe handle and delivery mechanism.

The numeral 10 indicates the handle of a hoe which is provided with the usual blade 11. This hoe handle is hollow interiorly as indicated at 12 and is provided adjacent its lower end with a diaphragm 13 which serves to stop seed from falling therebelow. The hollow handle 10 is further provided with a charging opening 14 normally closed by means of a suitable slide 15.

Adjacent the diaphragm 13 and immediately thereabove the handle 10 is provided with an opening 16 on the underside preferably termed the delivery opening. Covering the opening 16 is a casing 17 provided with a transverse slot 18 wherein moves a feed bar 19 having a feeding notch 20 formed in the lower edge thereof and provided with beveled side and bottom surfaces. This feed bar 19 is slidable transversely of the slot 18 so that it moves transversely of the hoe handle 10. At one end of this feed bar there is formed a slot 21 which receives the end of a spring 22 secured to the hoe handle as at 23 and arranged to normally hold the notch 20 in alinement with the opening 16. In order to operate this feed bar the hoe handle is provided with one or more guides 24 through which passes a pull rod 25 having a handle end 25. Secured to the hoe handle by means of a pivot pin 27 is one end of a T lever 28 the opposite arm thereof being connected to the member 19 by a pin and slot connection as indicated at 29. The pull rod 25 is connected to the stem of this lever as indicated at 30.

In the operation of the device the hoe is grasped just below the handle end 26 with the right hand while the left hand holds the hoe handle higher up. The hoe being turned in the usual manner so that one of the angles of the blade strikes the ground first the blade of the hoe is swung down to the ground and this causes the right hand to slip along the hoe handle 10 and draw upon the handle 26 which opens the feeding slide simultaneously with the blow being given to the ground. Now, since this feeding slide opens laterally the seed is deposited in exactly the proper place and is not blown off to one side as would be the case were the slide to deliver longitudinally. With the raising of the hoe the right hand slips down the handle and permits the closing of the slide for fresh charge of seed. There has thus been provided a simple and efficient device of the kind described and for the purpose specified.

Having thus described the invention, what is claimed as new, is:—

1. In a device of the kind described, a handle having a hollow portion provided with an opening on the underside thereof adjacent its lower end, a feed bar movable laterally across the handle and provided with a seed space adapted to be moved into and out of registry with the opening and means to actuate the feed bar, said means comprising a bell crank lever pivotally attached to the handle and the feed bar, and a pull rod provided with a handle extending up along the first mentioned handle.

2. In a device of the kind described, a handle having a hollow portion provided with an opening on the underside thereof adjacent its lower end, a casing covering said opening and having a lateral slot extending therethrough, a feed bar movable laterally across the handle and provided with a seed notch adapted to be moved into and out of registry with opening, said bar being held in said slot, and means to actuate the feed bar.

In testimony whereof, I affix my signature, in presence of two witnesses.

OBIE T. CUPPET.

Witnesses:
  W. S. RIDENOUR,
  H. A. MOSSER.